United States Patent [19]

Cutler et al.

[11] Patent Number: 5,752,031
[45] Date of Patent: May 12, 1998

[54] QUEUE OBJECT FOR CONTROLLING CONCURRENCY IN A COMPUTER SYSTEM

[75] Inventors: David N. Cutler, Bellevue; Charles T. Lenzmeier, Woodinville, both of Wash.

[73] Assignee: Microsoft Corporation, Redmond, Wash.

[21] Appl. No.: 427,007

[22] Filed: Apr. 24, 1995

[51] Int. Cl.$^6$ ............................................ G06F 9/46
[52] U.S. Cl. .................. 395/673; 395/677; 364/281.3; 364/281.7; 364/281.8; 364/281.4
[58] Field of Search .................. 395/700, 65, 673, 395/674; 364/281.3, 281.4, 281.7, 281.8

[56] References Cited

U.S. PATENT DOCUMENTS

| 5,187,790 | 2/1993 | East et al. | |
| 5,247,675 | 9/1993 | Farrell et al. | 395/650 |
| 5,321,841 | 6/1994 | East et al. | |
| 5,437,032 | 7/1995 | Wolf et al. | 395/650 |

Primary Examiner—Lucien U. Toplu
Assistant Examiner—Majid A. Banankhah
Attorney, Agent, or Firm—Klarquist Sparkman Campbell Leigh & Whinston

[57] ABSTRACT

A method and system for scheduling the execution of a plurality of threads in a computer system to control the concurrency level. Operating system data structures, called "queue objects," control the number of threads that are concurrently active processing incoming requests to an application program, a server or other processor of requests. The queue objects keep track of how many threads are currently active, and ensure that the number of active threads is at or near a predetermined target level of concurrency. By ensuring that new threads are not added to the pool of active threads if the system is operating at or above the target level of concurrency, the queue objects minimize the number of superfluous context switches that the operating system must perform and thus increases system efficiency and throughput.

26 Claims, 8 Drawing Sheets

FIG. 6 KERNEL QUEUE OBJECT

QUEUE OBJECT FOR CONTROLLING CONCURRENCY IN A COMPUTER SYSTEM

TECHNICAL FIELD

The present invention relates generally to computer operating systems, and more particularly relates to a method for controlling the number of threads that are active processing incoming requests to an application program, server, or other processor of requests.

BACKGROUND OF THE INVENTION

The operating system of a computer is the software responsible for providing an environment in which other computer programs can run, allowing them to take advantage of the processor and input/output (I/O) devices such as disk drives. One of the primary functions of an operating system is to make the computer hardware easier to use by shielding users from the obscurities of computer hardware. In addition, operating systems provide a mechanism for sharing hardware resources, such as the processor, among different users.

One of the limitations of early operating systems was that users could only run one program at a time, i.e., a user had to wait for one program to finish running before running another program. Modem operating systems, such as the "WINDOWS NT" operating system, developed by Microsoft Corporation, the assignee of the present invention, allow users to execute multiple programs concurrently. These are referred to as "multitasking" operating systems, meaning that the computer can work with more than one program at a time. For example, a user can edit a document while a compiler is compiling a large program in the background.

A multitasking operating system divides the work that needs to be done among "processes," giving each process memory, system resources, and at least one "thread of execution," an executable unit within a process. While a "process" logically represents a job the operating system must do, a "thread" represents one of possibly many subtasks needed to accomplish the job. For example, if a user starts a database application program, the operating system will represent this invocation of the database as a single process. Now suppose the user requests the database application to generate and print a report. Rather than wait for the report to be generated, which is conceivably a lengthy operation, the user can enter another database query while this operation is in progress. The operating system represents each request—the report and the new database query—as separate threads within the database process.

The use of threads to represent concurrent user requests extends to other areas of the operating system as well. For example, in a server application that accepts requests from a number of different clients, there will typically be many incoming requests to the file server, such as read and write requests.

At any given time during the operation of a computer system, there may be a large number of incoming requests to an application program, a server, or other processor of requests. An application program may process these requests by representing each incoming request as a thread of execution. The threads are provided by the operating system and can be scheduled for execution independently on the processor, which allows multiple operations to proceed concurrently.

Multitasking can cause contention for system resources that are shared by different programs and threads. Shared system resources include sets of information, physical devices and various programs or "operations." In order to resolve the contention for shared resources, the computer operating system must provide a mechanism for scheduling the execution of threads in an efficient and equitable manner, referred to as thread scheduling. In general, thread scheduling requires the operating system to keep track of the execution activity of the pool of threads that it provides to application programs for processing incoming user requests. The operating system also determines the order in which the threads are to execute, typically by assigning a priority level to each thread. The objective of the operating system is to schedule the threads in such a way that the processor is always as busy as possible and always executing the most appropriate thread. The efficiency in which threads are scheduled for execution on a processor distinguishes one operating system from another.

In multitasking operating systems, thread scheduling is more complex than simply selecting the order in which threads are to run. Periodically, a thread may stop executing while, for example, a slow I/O device completes a data transfer or while another thread is using a resource it needs. Because it would be inefficient to have the processor remain idle while the thread is waiting, a multitasking operating system will switch the processor's execution from one thread to another in order to take advantage of processor cycles that otherwise would be wasted. This procedure is referred to as "context switching." When the I/O device completes its data transfer or when the resource that the thread needs becomes available, the operating system will eventually perform another context switch back to the original thread. Because of the extraordinary speed of the processor, both of the threads appear to the user to execute at the same time.

Certain operating systems, such as the "WINDOWS NT" operating system, schedule threads on a processor by "preemptive multitasking," i.e., the operating system does not wait for a thread to voluntarily yield the processor to other threads. Instead, each thread is assigned a priority that can change depending on requests by the thread itself or because of interactions with peripherals or with the user. Thus, the highest priority thread that is ready to run will execute processor instructions first. The operating system may interrupt, or preempt, a thread when a higher-priority thread becomes ready to run, or after the thread has run for a preset amount of time, called a "time quantum." Preemption thus prevents one thread from monopolizing the processor and allows other threads their fair share of execution time. Two threads that have the same priority will share the processor, and the operating system will perform context switches between the two threads in order to allow both of them access to the processor.

When there are a large number of incoming requests to an application program, server, or other processor of requests, there is a high level of contention for shared system resources. In these cases, context switching can significantly improve the processing speed of the computer system by utilizing otherwise idle processing time to execute additional threads. The benefits of context switching may be even more apparent to users in a multiprocessor computer system because multiple threads can execute simultaneously, one thread for each processor. Even in cases where two threads must be executed synchronously, context switching in a multiprocessor system will usually allow for some overlap in the execution of the two threads, resulting in even faster processing time than a single processor system.

While context switching is generally a very useful and beneficial procedure, it will be appreciated that each context switch consumes processing time and valuable resources, thereby reducing the amount of other useful work that the processor can accomplish. In addition, many context switches are superfluous, meaning that the context switch is not actually necessary. Superfluous context switching is undesirable because it can increase latency in the system as well as reduce its capacity. Prior operating systems, however, do not have mechanisms to ascertain whether a context switch is superfluous.

Another limitation of prior operating systems is that they fail to provide any "concurrency control." Concurrency control refers to the operating system's ability to control the number of threads that are ready to execute incoming requests, otherwise known as the "concurrency level." Threads that are ready to execute are called "active" threads. When an application program creates a pool of threads to service incoming requests, prior operating systems will place those threads into a queue to schedule them for execution, but will not provide any concurrency control. Thus, these operating systems allow additional threads to be added to the pool of active threads without regard to the concurrency level. If the system is already operating at full capacity, for example, if there are at least as many threads active as the number of processors, then adding additional threads merely increases the level of contention in the system. This causes the operating system to potentially perform superfluous context switches in an effort to give each active thread its fair share of processing time.

Thus, in order to increase system efficiency, minimize superfluous context switches, and maximize system throughput, there is a need for a method of thread scheduling that controls the concurrency level of a pool of threads that are provided to execute incoming user requests.

That the present invention achieves these objectives and fulfills the needs described hereinabove will be appreciated from the detailed description to follow and the appended drawings.

SUMMARY OF THE INVENTION

Briefly described, the present invention provides an operating system data structure, called a "queue object," that controls the number of threads that are currently active processing incoming requests to an application program, server, or other processor of requests. Data structures, also referred to as records or formats, are organizational schemes applied to data so that it can be interpreted and so that specific operations can be performed on that data. The queue object provided by the present invention is a "kernel object." A kernel object is created and manipulated only within the kernel layer of the operating system. Only components that run in kernel mode can access and use queue objects directly.

In the present invention, the queue objects keep track of how many threads are currently active, and ensure that the number of active threads is at or near a predetermined target level of concurrency. By ensuring that new threads are not added to the pool of active threads if the system is operating at or above the target level of concurrency, the queue objects minimize the number of superfluous context switches that the operating system must perform and thus improve system throughput and increase system efficiency.

More particularly described, the present invention is directed to a computer system executing an operating system or other program module for controlling the execution of a plurality of threads provided by the operating system. The computer system comprises a microprocessor and a memory device coupled to the microprocessor and accessible by the operating system. Stored within the memory device are queue objects that are used by the operating system to control the concurrency level within the system.

Each queue object includes a first section containing an entry list of "work entries" that are to be distributed to threads for execution. The queue object also includes a second section containing the current number of active threads. This value is referred to as the "current concurrency level" or simply the "concurrency level." The queue object also includes a third section containing the target maximum number of threads that should be active processing queue object entries concurrently. In general, this value is set to the desired level of concurrency in the queue object, and is therefore referred to as the "target concurrency level."

The queue object also includes a fourth section containing a wait list of threads that are waiting for a work entry to be inserted into the entry list or for the concurrency level to drop below the target maximum number of threads. The queue object also includes sections that contain additional information, such as the name and size of the queue object, and the number of work entries that are included in the entry list.

According to one aspect of the present invention, the queue object is manipulated by an INSERT object service, which is called whenever there is a work entry to be inserted into the queue object entry list. The operation of the INSERT object service is dependent upon the current concurrency level of the queue object. If the current concurrency level corresponding to a particular queue object is less than its target concurrency level, then the microprocessor in the computer system is not as busy as desired and the current concurrency level may be allowed to increase. Therefore, the operating system may give the work entry to a waiting thread rather than inserting it into the queue object entry list in order to increase the number of threads that are active.

On the other hand, if the current concurrency level of a queue object is greater than or equal to its target concurrency level, then the processing unit is as busy or more busy than desired and the current concurrency level should not be increased. Therefore, the INSERT object service will cause the operating system to insert the new work entry into the entry list of the queue object rather than giving the work entry to a waiting thread. The action of giving the work entry to a waiting thread would have increased the level of contention for shared resources, thereby increasing the number of superfluous context switches and reducing system efficiency and throughput.

According to yet another aspect of the invention, the queue object is manipulated by a REMOVE object service, which is called when an active thread has finished processing a previous work entry and is ready to process another one. The operation of the REMOVE object service is also dependent on the current concurrency level. If the current concurrency level of a queue object is greater than or equal to its target concurrency level, then the microprocessor is either as busy or more busy than desired, and the current concurrency level should not be increased. Therefore, the operating system will not remove a work entry from the queue object entry list and the requesting thread will be placed in a wait state to wait until the concurrency level drops below the target maximum. The action of removing a work entry from the queue object entry list would have kept the level of contention for shared resources at a raised level, thereby increasing the number of superfluous context switches. It will be appreciated that when a requesting thread is put in a wait state to wait for the concurrency level to drop, it may drop the concurrency level of the queue object if the thread was previously active processing a work entry from the same queue.

On the other hand, if the current concurrency level of a queue object is less than its target concurrency level, then the microprocessor is not as busy as desired, and the current concurrency level allowed to increase. Therefore, the REMOVE object service will cause the operating system to attempt to remove a work entry from the queue object. If there is a work entry in the queue object entry list, then the work entry will be removed from the queue object and given to the current thread, thereby increasing or maintaining the concurrency level of the system. If the thread that is attempting to remove a work entry was previously processing a work entry from the same queue object, then the concurrency level will stay the same.

Therefore, it is an object of the present invention to control the concurrency level so as to minimize the number of superfluous context switches.

It is also an object of the present invention to ensure that the number of threads that are active processing entries from the queue at any given time remains at or near the desired level of concurrency.

DETAILED DESCRIPTION

Turning first to the nomenclature of the specification, the detailed description which follows is represented largely in terms of algorithms and processes and symbolic representations of operations by conventional computer components, including a central processing unit (CPU) associated with a general purpose computer system, memory storage devices for the CPU, and connected input/output (I/O) devices. These operations include the manipulation of data bits by the CPU and the maintenance of these bits within data structures supplied by one or more of the memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, an "algorithm" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as executing, incrementing, decrementing, comparing, assigning, inserting, removing, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices. The present invention relates to methods, processes, steps, or operations for a computer and the processing of electrical or other physical signals to generate desired physical signals.

In addition, it should be understood that the programs, algorithms, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawing figures, in which like numerals indicate like elements or steps throughout the several views, the preferred embodiments of the present invention will be described. Briefly described, the present invention provides an operating system data structure called a "queue object" that (1) controls the number of threads that are currently active processing work entries from the specified queue, referred to as the concurrency level, and (2) ensures that the number of active threads remains at or near a predetermined target level of concurrency. The present invention therefore ensures that the number of superfluous context switches are minimized, thereby improving system performance and system throughput.

Figure 1:
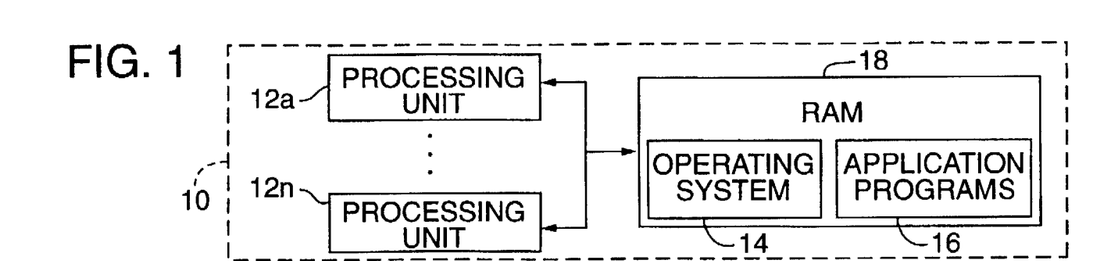
FIG. 1 is a block diagram illustrating the preferred operating environment for the preferred embodiment of the present invention.

FIG. 1 illustrates the preferred operating environment for the preferred embodiment of the present invention. The computer system 10 comprises at least one high speed processing unit 12, or microprocessor, which operates to execute an operating system 14 and application programs 16 desired by a user of the system. The operating system 14 is the set of software which controls the computer system's operation and the allocation of resources. While the computer system 10 is shown with a plurality of processing units 12a–12n, the computer system may also operate with a single processing unit 12. The operating system 14 and application programs 16 can be stored within a memory device 18 which is coupled to the processing units 12a–12n.

Memory device 18 may comprise a data storage device such as a hard disk, floppy disk, random access memory (RAM), read-only memory (ROM), CD-ROM, or any other volatile or non-volatile memory storage system.

As is well known in the art, operating system 14, application programs 16 or other program modules comprise sequences of instructions that can be executed by the processing units 12a–12n. The term program module can refer to the original source code or to the executable, or machine language, version. A source code program module comprises all statements and files necessary for complete interpretation or compilation, and an executable program module can be loaded into a given environment and executed independently of other programs.

Figure 2:
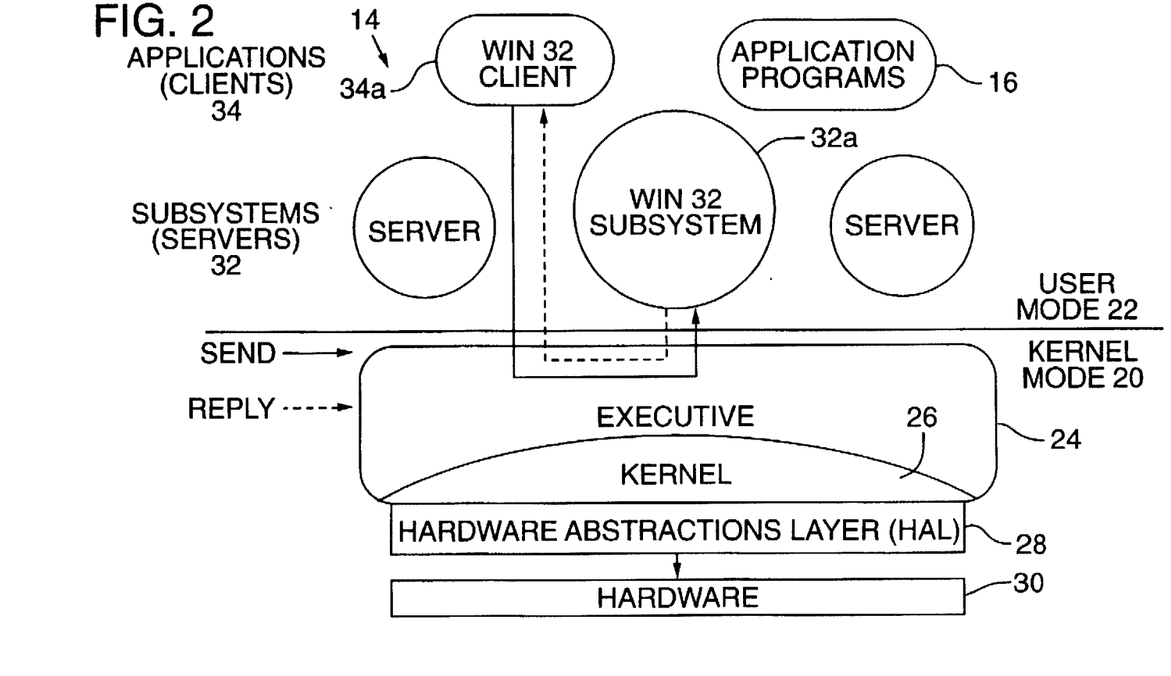
FIG. 2 is a diagram illustrating the structure of the "WINDOWS NT" operating system.

In the preferred embodiment, the operating system 14 is the "WINDOWS NT" operating system, illustrated in detail in FIG. 2. Referring to FIG. 2, the "WINDOWS NT" operating system is divided into two parts: the "kernel mode" 20 and the "user mode" 22. The kernel mode 20 is a privileged processor mode in which the operating system code runs, with access to system data and to the hardware 30. The hardware 30 is part of the computer system 10 shown in FIG. 1 and may include processing units 12a–12n, memory device 18 and input/output (I/O) devices (not shown). Referring back to FIG. 2, the user mode 22 is a nonprivileged processor mode in which servers (or "subsystems") 32 and application programs 16 run, with a limited set of interfaces available and with limited access to system data.

The kernel mode portion of the operating system 14 is called the "executive" 24. The executive 24 comprises modules that implement virtual memory management, object (resource) management, I/O and file systems, interprocess communication, and portions of the security system. The structure and operation of certain components of the executive 24 will be described in detail below.

The bottommost portions of the executive 24 are called the "kernel" 26 and the "hardware abstraction layer" ("HAL") 28. The kernel 26 performs low-level operating system functions, such as thread scheduling, interrupt and exception dispatching, and multiprocessor synchronization. The hardware abstractions layer (HAL) 28 is a layer of code that isolates the kernel 26 and the rest of the executive 24 from platform-specific hardware differences. The HAL 28 hides hardware-dependent details such as I/O interfaces, interrupt controllers, and multiprocessor communication mechanisms. Rather than access hardware 30 directly, the components of the executive 24 maintain portability by calling the HAL 28 routine when platform-specific information is needed.

The user mode portion of the operating system 14 is divided into several "subsystems" 32, also called servers, such as the Win32 subsystem 32a, and applications or "clients" 34, such as the Win32 client 34a. Each subsystem 32 implements a single set of services, for example, memory services, process creation services, or processor scheduling services. The Win32 subsystem 32a, for example, makes a 32-bit application programming interface (API) available to application programs 16. Each subsystem 32 runs in user mode 22, executing a processing loop that checks whether a client 34 has requested one of its services.

The client 34, which may be another operating system component or an application program 16, requests a service by sending a message to the subsystem 32, as represented by the solid arrow between the Win32 client 34a and the Win32 subsystem 32a. The message passes through the executive 24, which delivers the message to the subsystem 32. After the subsystem 32 performs the operation, the executive 24 returns the results to the client 34 in another message, as represented by the dotted arrow between the Win32 subsystem 32a and the Win32 client 34a.

Figure 3:
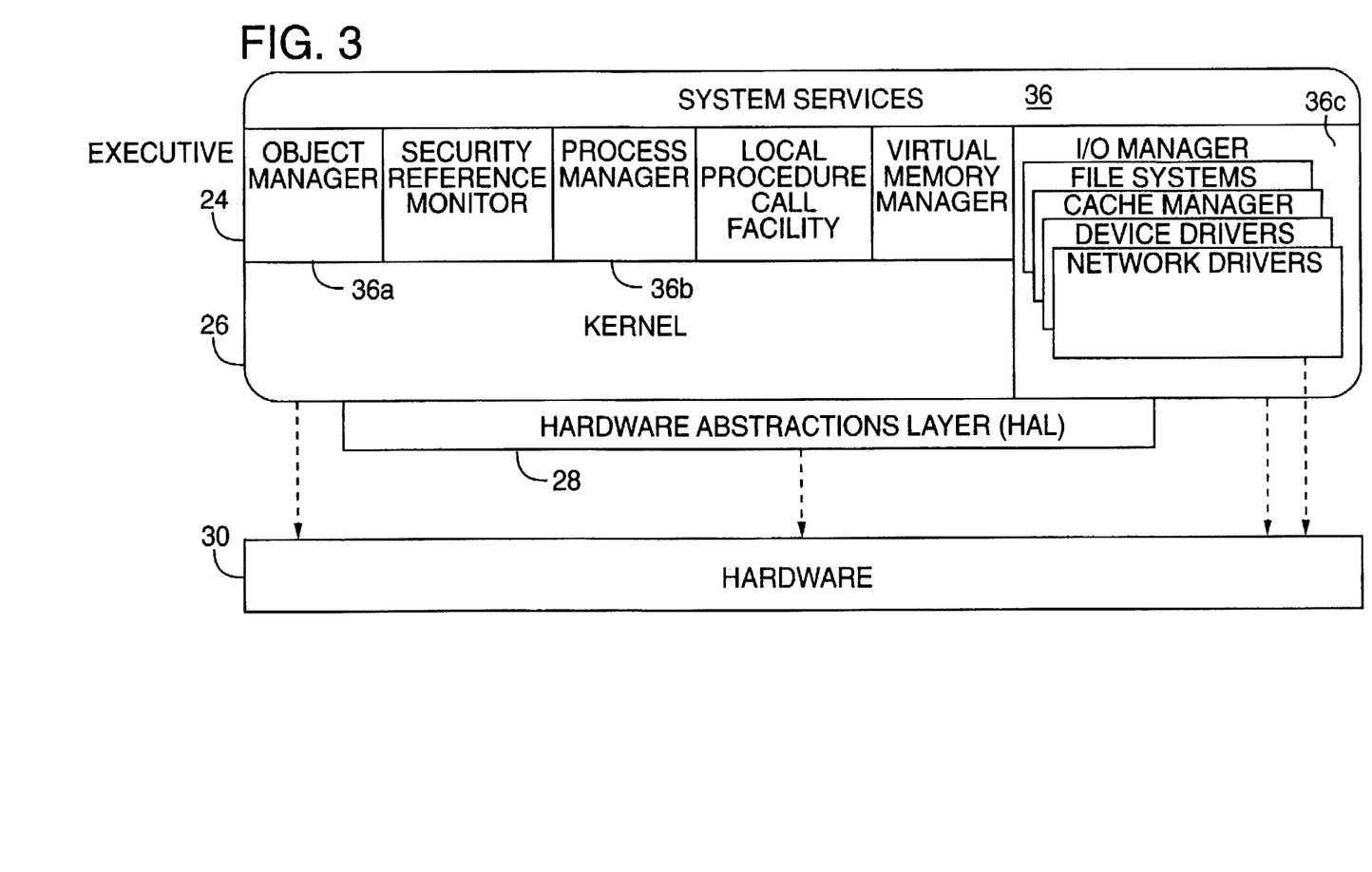
FIG. 3 is a detailed diagram illustrating the structure of the kernel mode portion of the operating system shown in FIG. 2.

FIG. 3 is a detailed diagram of the kernel mode portion of the operating system 14 shown in FIGS. 1 and 2. Referring now to FIG. 3, the executive 24 is a series of components, each of which implements two sets of functions: system services 36, which subsystems 32 and other executive components can call, and internal routines, which are available only to components within the executive 24. System services 36 include the object manager 36a, which creates, manages, and deletes objects, which are abstract data structures used to represent operating system resources; the process manager 36b, which creates and terminates processes and threads, and suspends and resumes the execution of threads; and the I/O manager 36c, which implements device-independent input/output (I/O) facilities as well as device-dependent I/O facilities.

With that introduction of the operating environment of the preferred embodiment, a brief overview of the general operation of the operating system 14 and an introduction of terminology is now provided before discussing the details of the preferred embodiment. Referring to FIGS. 1–3, in the preferred embodiment, shareable resources, such as files, memory, processes and threads are implemented as "objects" and are accessed by using "object services." As is well known in the art, an "object" is a data structure whose physical format is hidden behind a type definition. Data structures, also referred to as records or formats, are organizational schemes applied to data so that it can be interpreted and so that specific operations can be performed on that data. Such data structures impose a physical organization upon the collection of data stored within computer memory and represent specific electrical or magnetic elements.

An "object type," also called an "object class," comprises a data-type, services that operate on instances of the data type, and a set of object attributes. An "object attribute" is a field of data in an object that partially defines the object's state. An "object service" implements and manipulates objects, usually by reading or changing the object attributes. In the preferred embodiment, the object manager 36a creates, deletes, protects, and tracks user application visible objects.

The operating system 14 allows users to execute more than one program at a time by organizing the many tasks that it must perform into "processes." The operating system 14 allocates a portion of the computer's resources to each process and ensures that each process's program is dispatched for execution at the appropriate time and in the appropriate order. In the preferred embodiment, this function is implemented by the process manager 36b.

In the preferred embodiment, processes are implemented as objects. A process object comprises the following elements:

an executable program;
    a private address space;
    system resources (e.g., communication ports and files) that the operating system 14 allocates to the process as the program executes; and
    at least one "thread of execution."

A "thread" is the entity within a process that the kernel 26 schedules for execution. Threads will be described in greater detail below.

The process object, like other objects, contains a header that stores standard object attributes, such as the process's name and the object directory in which its name is stored. The process manager 36b defines the attributes stored in the body of process objects.

Among the attributes of process objects is the process's "base priority," which helps the kernel 26 regulate the execution of threads in the system, as will be described in greater detail below. The priority of individual threads varies but always stays within range of their process's base priority. Thus, subsystems 32 operating in user mode 22 can use the process object's base priority to influence which process's threads are given preference for execution by the kernel 26.

While processes represent the jobs that the operating system 14 must do, threads represent the many subtasks needed to accomplish the jobs. Each thread belongs to one, and only one, process and resides within the process's virtual address space, using the address space for storage during the thread's execution. Multiple threads can be scheduled for execution independently on a processing unit 12, which allows such threads to execute simultaneously on a multiprocessor computer system.

As is well known in the art, each thread has an associated "context," which is the volatile data associated with the execution of the thread. A thread's context includes the contents of system registers and the virtual address space belonging to the thread's process. Thus, the actual data comprising a thread's context varies as it executes.

In the preferred embodiment, threads are also implemented as objects. Among the attributes of thread objects is the thread's priority class, which in the preferred embodiment ranges from two levels below the process's base priority to two levels above it. Each thread also has a "dynamic priority" that generally begins at the thread's base priority and varies upward depending on the type of work the thread is doing. For example, if the thread is responding to user input, the kernel 26 raises its dynamic priority. If, on the other hand, the thread is compute bound, the kernel 26 gradually lowers its dynamic priority to its base priority. Thus, it will be appreciated that the subsystems 32 in the user mode portion of the operating system 14 can control the relative priorities of threads within a process by lowering one thread's base priority and raising another thread's base priority.

The kernel 26 works with a subset of the information in an executive thread object, which is referred to as a "kernel thread object." The executive 24 implements two kinds of objects: "executive objects" and "kernel objects." Executive objects are implemented by various components of the executive 24 and are available to user mode subsystems 32. Kernel objects, on the other hand, are a more primitive set of objects implemented by the kernel 26. Unlike executive objects, kernel objects are not visible to user mode subsystems 32. Rather, kernel objects are created and used only within the executive 24. Thus, kernel thread objects are contained within executive thread objects and represent only the information the kernel 26 needs in order to dispatch threads for execution.

Figure 4:
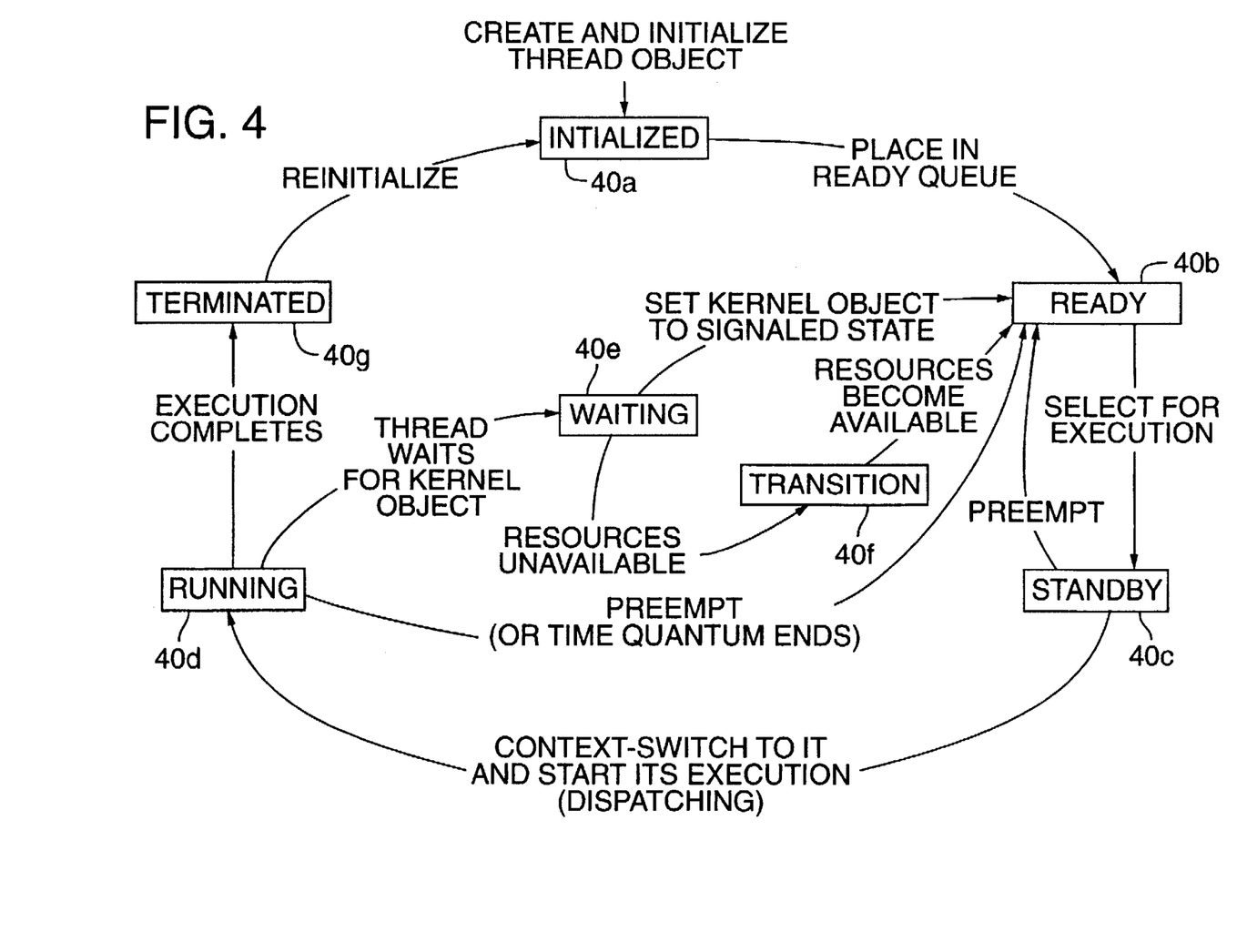
FIG. 4 is a diagram illustrating the seven different thread states the relationships among them.
Figure 5:
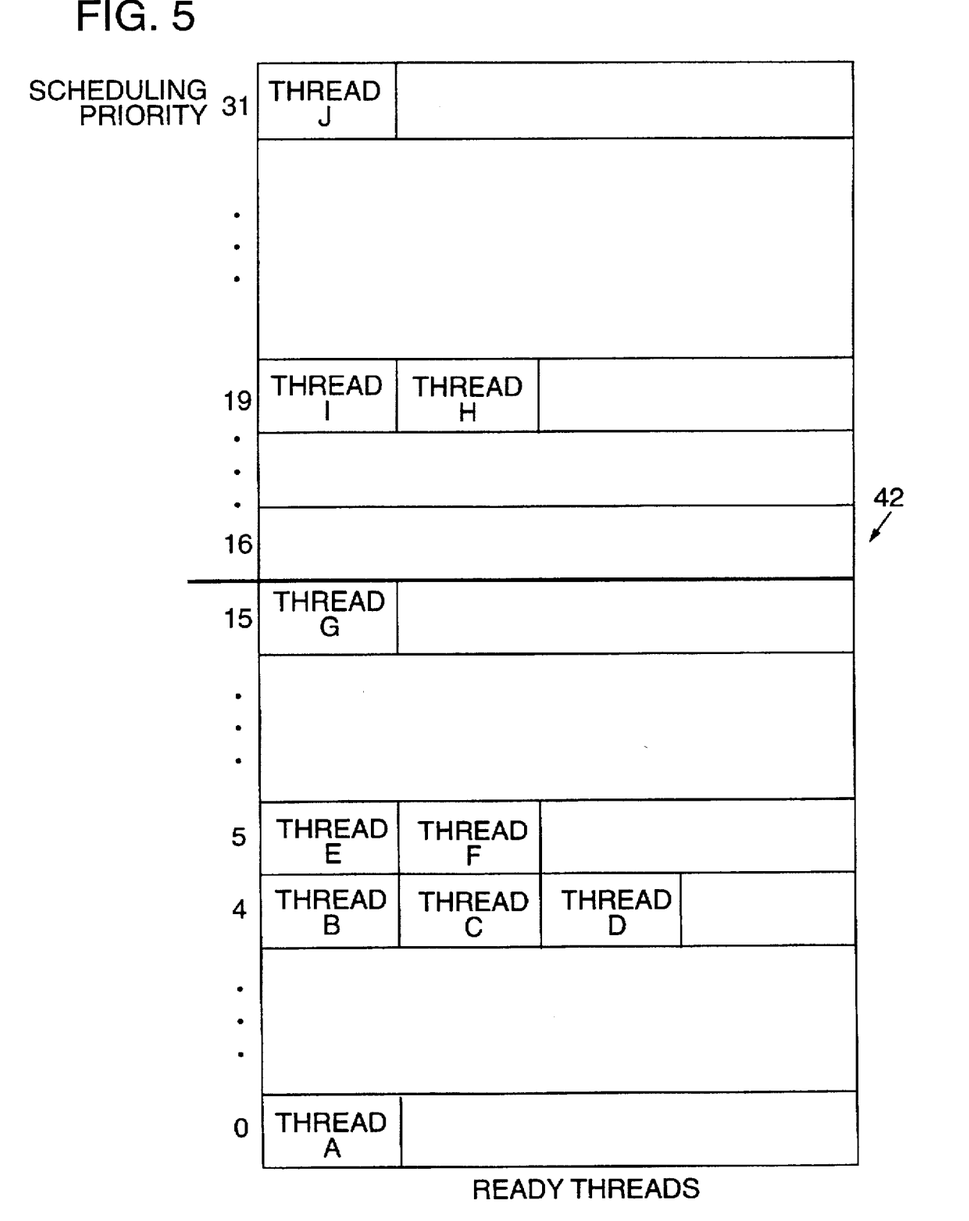
FIG. 5 is a diagram illustrating the dispatcher ready queue.

Among the information that is contained in the kernel thread object is the current "state" of a thread. A thread can be in any one of seven different states at any given time, as illustrated in FIG. 4. Referring to FIGS. 1–4, the first state is the "initialized" state 40a. When a request is passed to the executive 24, the process manager 36b allocates space for a thread object and calls the kernel 26 to initialize the kernel thread object contained within it. Once initialized, the thread progresses to the "ready" state 40b when it is placed in a "dispatcher ready queue" 42, as shown in FIG. 5. The dispatcher ready queue will be described in detail below. A thread in the ready state 40b is simply waiting to execute.

A thread in the "standby" state 40c has been selected for execution on a particular processing unit 12. Thus, only one thread can be in the standby state for each processing unit 12 in the computer system 10. When the correct conditions exist, the kernel 26 performs a "context switch" to this thread. In general, context switching refers to the switching of the processing unit's 12 execution from one thread to another. More particularly, a context switch is the procedure of saving the volatile machine state associated with a running thread, loading another thread's volatile state, and starting the new thread's execution.

The module that performs these duties is the kernel's "dispatcher" (not shown). The dispatcher's primary job is to ensure that the processing unit 12 is always executing the most appropriate thread. When system events occur that change the status of some thread, the dispatcher examines the list of waiting threads and performs a context switch to a new thread if a change is required.

Once the dispatcher performs a context switch to a thread, the thread enters the "running" state 40d and executes on a processing unit 12. The thread's execution continues until either the kernel 26 preempts it to run a higher priority thread, it terminates, it has run for a preset amount of time (called its "time quantum"), or it voluntarily enters the "waiting" state 40e.

A thread can enter the waiting state 40e in several ways. First, a thread can voluntarily wait on a kernel object to synchronize its execution. Second, a component of the operating system 14, for example, the IO system, can wait on the thread's behalf, and third, a user mode subsystem 32 can direct the thread to suspend its execution. As will be explained in greater detail below, a thread may also transition from the running state 40d to the waiting state 40e because the concurrency level is too high and a queue removal is attempted. When the thread's wait ends, the thread moves back to the ready state 40b to be rescheduled.

A thread may enter a "transition" state 40f if it is ready for execution, but the resources it needs are not available. For example, the information that the thread needs might be paged out of RAM (memory device 18). Once the resources that the thread needs become available, the thread enters the ready state 40b.

When a thread finishes executing, it enters the "terminated" state 40g. Once terminated, the thread object may be deleted or reinitialized, depending on the policies set forth in the object manager 36a.

The term "active thread" as used herein is used to refer to a thread that is in the ready state 40b, the standby state 40c, the running state 40d, or the transition state 40f.

Threads are scheduled for execution on the processing unit 12 by the kernel 26. When looking for a thread to execute, the kernel's dispatcher considers only the pool of threads in the ready state 40b. As described above, the kernel's dispatcher uses a priority scheme to determine the order in which threads should execute, scheduling higher-priority threads before those with lower priorities. The kernel 26 may preempt a thread's execution if a higher-priority thread becomes ready to execute.

In order to make thread-scheduling decisions, the kernel 26 maintains a database that keeps track of which threads are waiting to execute and which processors are executing which threads. The database includes a "dispatcher ready queue" 42 as shown in FIG. 5. The dispatcher ready queue 42 is actually a series of queues, one queue for each scheduling priority. Each queue in the dispatcher ready queue 42 contains threads that are in the ready state 40b, waiting to be scheduled for execution.

Referring to FIGS. 1, 2, 4 and 5, the operating system 14 supports different levels of priority, with the higher priority threads in the ready state 40b represented at the top of the dispatcher ready queue 42 and the lower priority threads in the ready state 40b represented at the bottom of the dispatcher ready queue 42. When the kernel 26 reschedules a processing unit 12, it starts at the highest-priority queue and works downward until it finds a thread.

In the preferred embodiment, there are 32 priority levels, with priority level 31 being the highest priority and priority level 0 being the lowest. Thus, in the example shown in FIG. 5, the kernel 26 would schedule Thread J for execution first because it is the highest priority thread in the dispatcher ready queue 42. The next highest priority level in which there are threads is priority level 19, in which there are two threads in the queue for that priority level, Thread I and Thread H. Because Thread I is shown to be first in that queue, Thread I would be scheduled for execution next, followed by Thread H. The kernel 26 continues the scheduling of threads in a similar fashion until all threads in the ready state 40b are scheduled for execution.

As discussed, there are certain system events that may occur which cause a processing unit 12 to be rescheduled, for example, the completion of a time quantum, when a thread's priority changes, or when a thread enters the waiting state 40e. The purpose of rescheduling is to select the thread to execute next on a particular processing unit 12 and put it in the standby state 40c.

After the threads are rescheduled, the dispatcher must start the new thread's execution by performing a context switch to the new thread. The actual procedure for context switching is dependent on the architecture of the processing unit 12. However, a typical context switch requires saving and reloading data such as the thread's program counter, the processing unit's status register, stack pointers, and other register contents. To make a context switch, the kernel 26 saves this information by pushing in onto the current thread's kernel-mode stack and updating the stack pointer. The kernel 26 loads the new thread's context and, if the new thread is in a different process, loads the address space of its page table directory so that its address space is available.

Thus, it will be appreciated that context switching, while generally a very useful and beneficial procedure, can also reduce the performance level of the computer system if it is performed at a high rate every context switch consumes valuable processing time and resources, thereby reducing the amount of other useful work that the processing unit 12 can accomplish. In addition, many context switches are superfluous, meaning that the context switch is not actually necessary. Those skilled in the art will appreciate that superfluous context switches increase latency and reduce the capacity of the system.

The present invention provides operating system data structures called "queue objects" that control the number of threads that are active processing incoming requests to the operating system, otherwise known as the concurrency level. The queue objects keep track of how many threads are currently active, and ensure that the number of active threads is at or near a predetermined target level of concurrency. By ensuring that new threads are not added to the pool of active threads if the system is operating at or above the target level of concurrency, the preferred embodiment minimizes the number of superfluous context switches that the kernel must perform.

Queue objects, which are created by the operating system as needed and stored within memory device 18, are "kernel objects," i.e., they are not visible to user-mode code. In other words, queue objects are used only within the executive 24 and may therefore also be referred to as "kernel queue objects."

Figures 6, 7A, 7B:
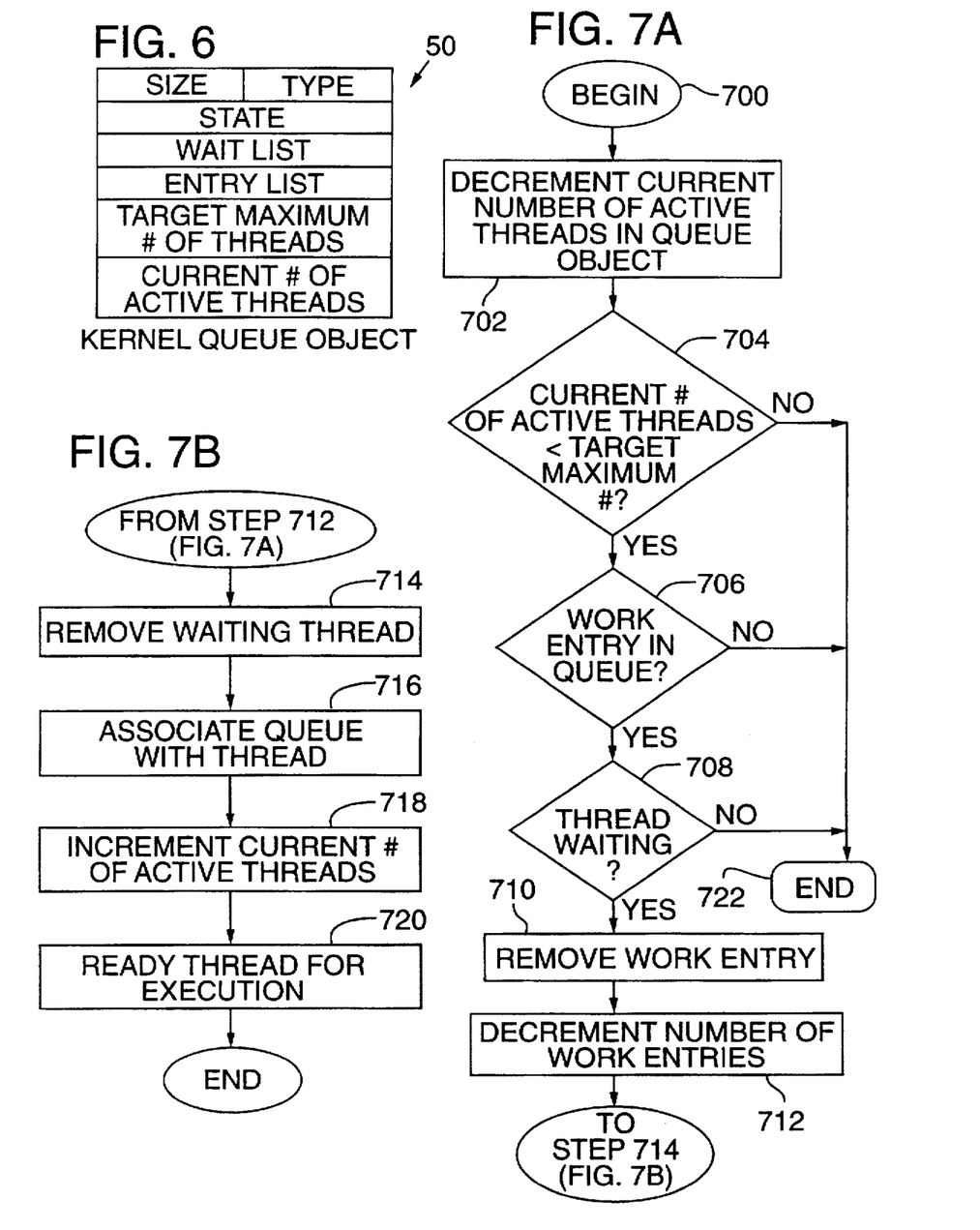
FIG. 6 is diagram illustrating the format of the queue object.
FIGS. 7A-B illustrate the activating of a waiting thread and its affect on the concurrency level.

Each queue object, also referred to simply as a queue, is formatted in a predetermined format as shown in FIG. 6 and described below:

Size: the size of the queue object 50. In the preferred embodiment, the size of the queue object 50 is fixed at 32 bytes. However, the present invention should not be limited to this or any other size.

Type: the name of the queue object 50 of this type.

State: the number of "work entries" in the entry list, as defined below. A "work entry" is any request that is placed in the queue object 50 to be distributed to a thread for execution.

Wait List: a list of threads that are waiting for a set of conditions to be satisfied so they can be removed from the wait list and placed in the dispatcher ready queue 42 (FIG. 5). In the preferred embodiment, threads are waiting either for a work entry to be inserted into the entry list, as defined below, and/or for the "concurrency level" to drop below the target maximum number of threads. The "concurrency level" is defined as the current number of active threads.

Entry List: a list of work entries to be distributed to the pool of threads for execution.

Target Maximum Number of Threads: the target number of threads that should be active processing queue object entries concurrently. In general, this value is set to the desired level of concurrency with respect to the queue object and is therefore also referred to as the "target concurrency level." In the preferred embodiment, the target maximum number of threads has a default value set to the number of processing units 12 in the system, but is not limited to this value.

Current Number of Active Threads: the number of threads that are currently active, i.e., in the ready state 40b, the standby state 40c, the running state 40d, or the transition state 40f. This number is also referred to as the "current concurrency level" or simply the "concurrency level."

Referring to FIGS. 7A–B, the interaction between a queue object with the waiting and unwaiting of threads will be described. In the preferred embodiment, a waiting thread is activated when the concurrency level in a queue object drops below the target maximum level or when an attempt is made to remove a work entry from a queue object. More specifically, the activate waiter operation, described below, attempts to remove another work entry from the old associated queue object and give it to another thread to execute.

Referring to FIGS. 7A–B, the operational flow of the activate waiter procedure begins at step 700. When a thread that is active processing a work entry from a queue object enters the waiting state 40e (FIG. 4), the concurrency level of the corresponding queue object is decremented at step 702 to reflect the decrease in the number of active threads in that queue object. Next, the resultant concurrency level is measured to determine if another thread should be activated to process a work entry. If, at step 704, the resultant concurrency level is below the target maximum level (i.e., if the number of active threads is less than the target maximum number of threads), then an attempt is made to activate another thread to process an entry from the respective queue object.

If, on the other hand, the resultant concurrency level is not less than the target maximum level, then an attempt to activate another thread will not be made and the process ends at step 722. Activating another thread would only increase the level of contention for shared resources, thereby increasing the number of superfluous context switches and reducing throughput.

An attempt to activate another thread will only be successful if there is a work entry in the queue object (entry list) and there is a thread waiting to remove it (wait list). Therefore, if there is a work entry in the queue object at step 706 and there is a waiting thread at step 708, then the work entry is removed at step 710. The number of work entries in the entry list is then decremented at step 712 and the waiting thread is removed at step 714. At step 716, the queue object is "associated" with the thread. A queue object is "associated" with a thread object while the thread is processing a work entry from the queue object. This is done by storing a direct pointer to the queue object in the thread object. The association survives until the thread attempts to remove a work entry from a different queue object or the thread terminates. The current number of active threads in the queue object is then incremented at step 718, and the thread is readied for execution at step 720. The procedure ends at step 722.

The association between the thread and the queue object is important because it allows the wait and unwait procedure to properly increment and decrement the concurrency level for the proper queue object when a thread is waited or unwaited, thereby keeping the concurrency level correct.

In the preferred embodiment, the attributes of the queue object 50 are manipulated by two object services: INSERT and REMOVE. The INSERT and REMOVE object services are called whenever there is a work entry to be inserted or removed from the queue object 50. In general, the operation of the INSERT and REMOVE object services on the queue object 50 together ensure that, when a work entry is to be inserted or removed from the queue object 50, the concurrency level remains at or near the target level of the concurrency as set by the creator of the queue object.

Figure 8:
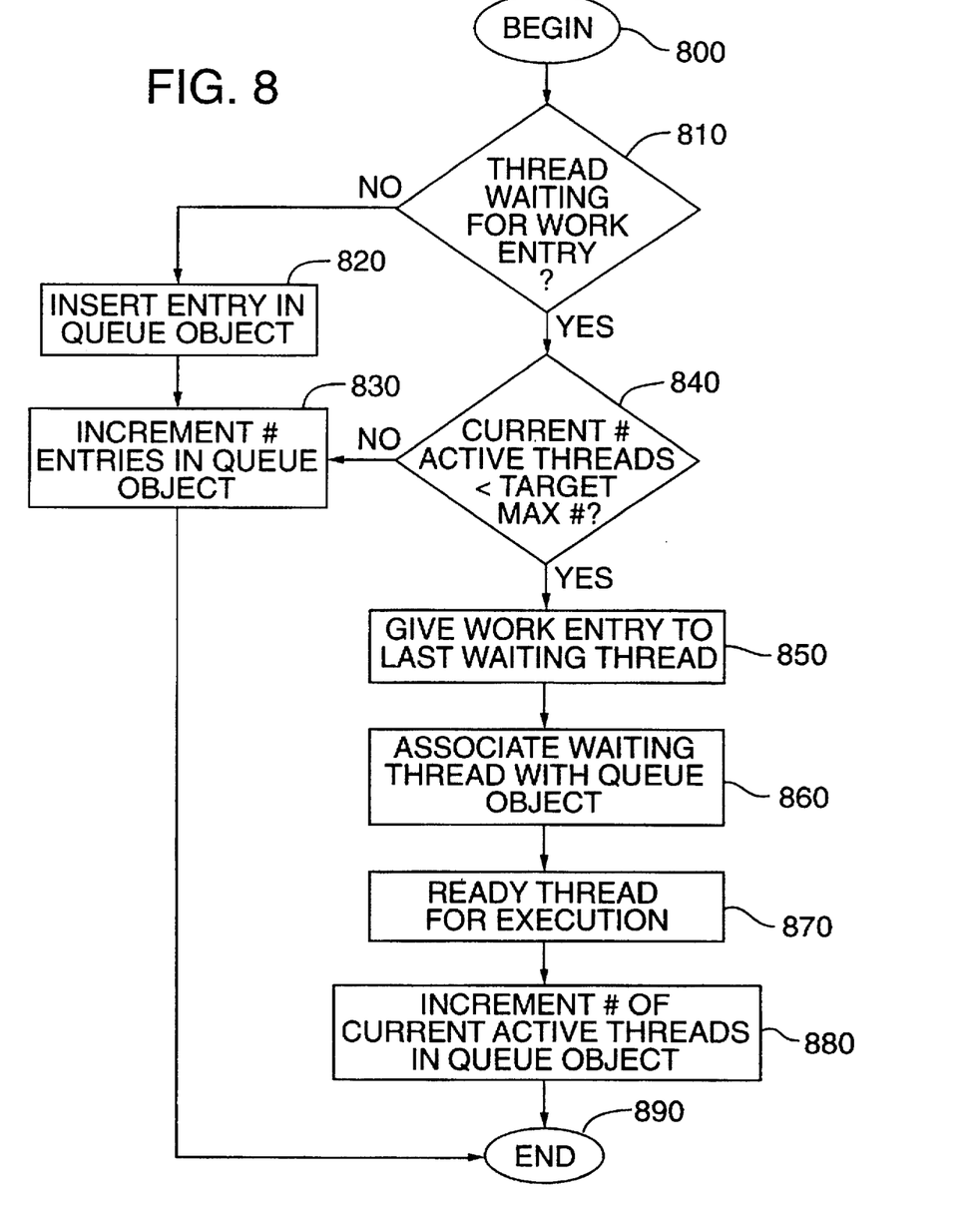
FIG. 8 is a flow chart illustrating the "INSERT" object service for the queue object shown in FIG. 6.

FIG. 8 is a flow chart illustrating the steps of the INSERT object service that may be performed on the queue object 50. The operation of the INSERT object service is dependent on the current concurrency level. In general, if the current concurrency level of a queue object is less than its target concurrency level, then the work entry can be given to a waiting thread, if there is one, thereby increasing the concurrency level. On the other hand, if the current concurrency level is greater than or equal to its target concurrency level, then the INSERT object service will cause the work entry to be inserted into the queue object entry list rather than be given to a waiting thread. The action of giving the work entry to a waiting thread would only have increased the level of contention for shared resources, thereby increasing the number of superfluous context switches and reducing system efficiency.

Referring to FIGS. 1, 4, 6 and 8, the operational flow begins at step 800. An INSERT object service will be called whenever there is a work entry to be inserted in the queue object 50. Typically, this is when some work arrives to be processed (e.g., a request from the network) or when some work has been completed (e.g., the completion of an I/O request). At step 810, it is determined whether there is a thread waiting for a work entry. If there is not a thread waiting on a work entry, then, at step 820, the new work entry is inserted in the entry list of the queue object 50. The number of work entries in the entry list of the queue object 50, i.e., the "state" of the queue object 50, is then incremented at step 830. The INSERT object service then ends at step 890.

If, on the other hand, there is a thread waiting for a work entry at step 810, then at step 840 the current number of active threads is compared to the target maximum number of threads. The target maximum number of threads is preferably, but not necessarily, equal to the number of processing units 12a–12n in the system. Thus, it will be appreciated that if the current number of active threads is greater than or equal to the target maximum number, then there are sufficient threads executing concurrently. Adding more concurrency would lead to increased context switching and decreased system performance.

On the other hand, if the current number of active threads is smaller than the target maximum number, then there are less threads trying to execute concurrently than there are processing units 12a–12n, i.e., there is not enough concurrency in the system. In order to ensure that all processing units 12a–12n are always as busy as possible, while minimizing superfluous context switching, the preferred embodiment attempts to keep the current number of active threads at or near the target level of concurrency.

Accordingly, if at step 840 the current number of active threads is greater than or equal to the target maximum number of threads, i.e., there is sufficient concurrency, then, at step 820 the work entry is inserted in the entry list of the queue object 50, and the number of entries in the entry list of the queue object 50 is incremented at step 830. In other words, the work entry is not given to a thread even though there are waiting threads available. Because the target level of concurrency has already been reached or exceeded, giving the work entry to the waiting thread would increase the number of threads trying to execute, possibly increasing the amount of context switching. By ensuring that the current number of active threads remains at or near the predetermined target level of concurrency, the preferred embodiment minimizes the number of superfluous context switches.

If, on the other hand, at step 840, the current number of active threads is less than the target maximum number of threads, i.e., the current level of concurrency is lower than the target concurrency level, then at step 850 the work entry can be given to a waiting thread instead of inserting it into the queue. Because the target concurrency level in this case has not yet been reached, the work entry is given to the waiting thread in order to raise the current concurrency level toward its target concurrency level.

In the preferred embodiment, the work entry is given to the thread that has been waiting in the wait list for the least amount of time, referred to as the last waiting thread. In other words, the last thread that waits is the first to have its wait satisfied, i.e., a last-in first-out (LIFO) order. This is unlike other conventional kernel objects that have a first-in first-out (FIFO) discipline. It has been found that the LIFO wait discipline allows the most recently run thread to run first, thereby providing better cache performance. Furthermore, the LIFO discipline causes "excess" threads to timeout if they have been waiting for a long time, thereby providing control so that the size of the thread pool can be reduced if desired. Because threads require resident memory structures to describe them and significant processor time to manage them, keeping the size of the thread pool to a minimum allows the computer's resources to be used to accomplish other useful tasks.

While the preferred embodiment contemplates the use of a LIFO wait discipline, the present invention need not be so limited. Rather, the present invention also specifically contemplates the use of a traditional FIFO wait discipline.

Still referring to FIGS. 1, 4, 6 and 8, the queue object 50 is associated with the waiting thread at step 860 by storing a pointer to the queue object in the thread object. At step 870, the waiting thread is readied for execution, i.e., the thread that has been given the work entry is switched from the waiting state 40e to the ready state 40b. At step 880, the number of current active threads in the queue object 50 is incremented, thereby increasing the current concurrency level. The INSERT object service then ends at step 890.

Thus, it will be understood that the operation of the INSERT object service on the queue object 50 may be used to control the concurrency level. The number of active threads is allowed to increase by giving a work entry to a waiting thread when there is not enough concurrency. On the other hand, the INSERT object service ensures that the number of active threads is not increased when there is sufficient concurrency. Instead the work entry is placed in the entry list of the queue object 50.

Figure 9A:
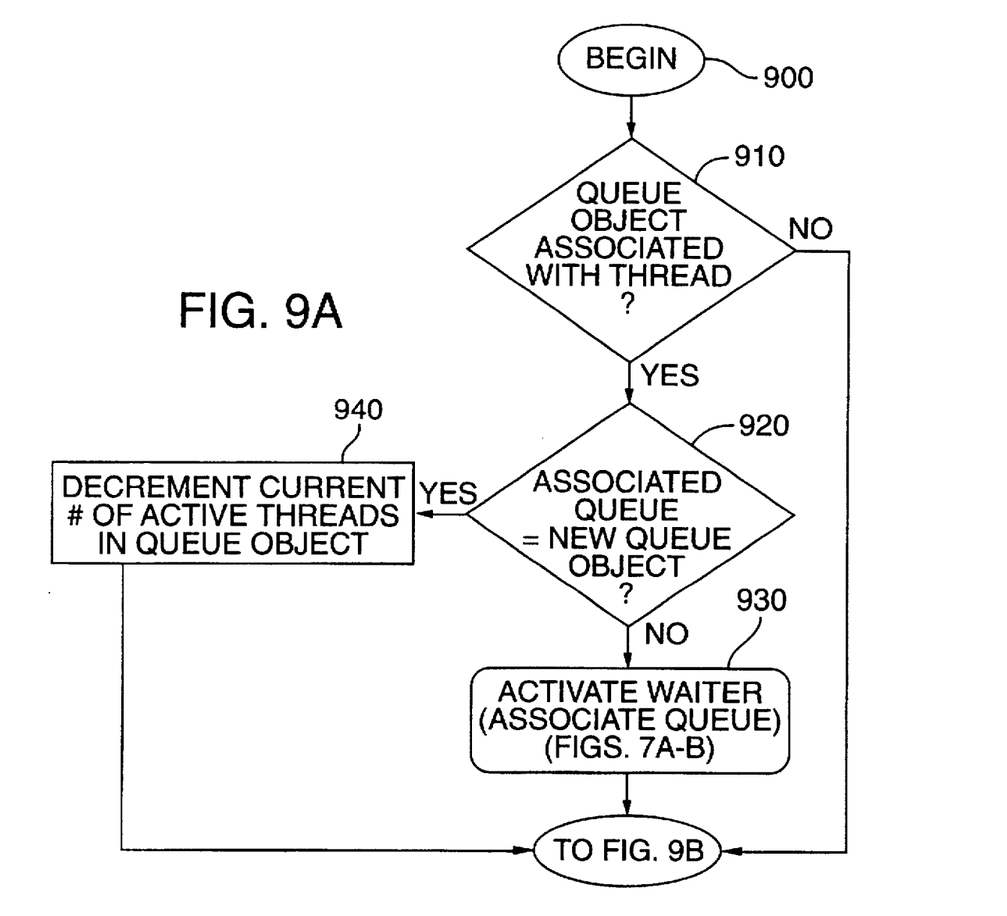
FIGS. 9A-B illustrate the "REMOVE" object service for the queue object shown in FIG. 6.
Figure 9B:
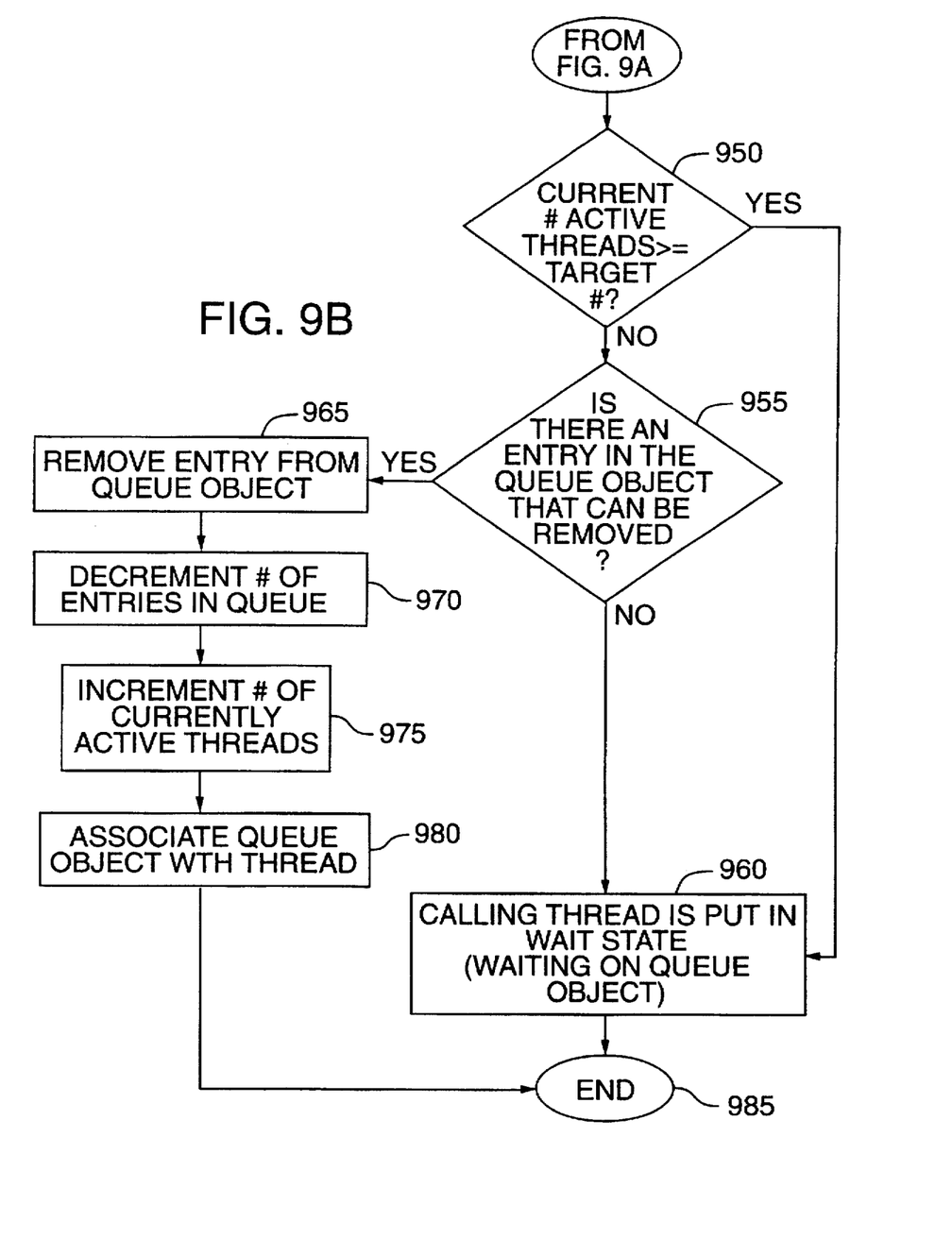

FIGS. 9A–B is a flow chart illustrating the steps of the REMOVE object service that may be performed by a thread on the queue object 50. A REMOVE object service may be called whenever a thread has completed processing a previous work entry and is ready to process another. Like the INSERT object service, the operation of the REMOVE object service is dependent on the concurrency level. In general, if the current concurrency level of a queue object is greater than or equal to its target concurrency level, then the REMOVE object service will not remove an entry from that queue object. The action of removing an entry from the queue object would have kept the level of contention for shared resources at a raised level, thereby increasing the number of superfluous context switches.

The REMOVE operation is different than the activate waiter operation discussed above. REMOVE is executed in the context of the current thread and attempts to remove a work entry from a queue object for that thread. Activate waiter, on the other hand, attempts to remove a work entry for another thread.

Referring to FIGS. 4, 6 and 9A–B, the operational flow begins at step 900. At step 910, it is determined whether the queue object 50 is associated with the thread. If not, then the procedure moves to step 950. On the other hand, if the queue object 50 is associated with the thread, then at step 920 it is determined whether the thread is attempting to remove the work entry from a new queue object, i.e., a queue object other than the one that the thread was previously associated with (referred to as the "old queue object"). In most cases, the thread will continually process work entries from the same queue and therefore the "old queue" and the "new queue" will be the same. However, they can be different and the present invention can handle either case.

If the currently associated queue object is the same as the queue on which the REMOVE operation is being performed, then the current number of active threads in the queue object is decremented at step 940. Alternatively, if the currently associated queue object is not the same queue, then the activate waiter subroutine (FIGS. 7A–B) is executed at step 930. As stated above, this subroutine attempts to remove another entry from the old associated queue object and give it to a new thread to execute since the current thread is switching to process another queue object.

After the activate waiter subroutine is executed, or alternatively, after the current number of active threads for the queue is decremented, then the current number of active threads (concurrency level) is compared to the target maximum level at step 950. If the current number of active threads is greater than or equal to the target maximum number of threads, then the current concurrency level is sufficient. Therefore, at step 960 the current thread is put in the waiting state 40e, and the routine ends at step 985.

In the preferred embodiment, the current thread that is put in the waiting state 40e is the thread that is executing when the call to remove actually is executed, referred to as the "calling" thread. Because there is already enough concurrency in the system, it is not desirable to have the calling thread continue to execute by attempting to remove another work entry from the queue object 50.

If, on the other hand, at step 950 the current number of active threads is less than the target maximum number of threads, then the current concurrency level is not sufficient. At step 955, it is determined whether there is a work entry in the entry list of the queue object 50 that can be removed. In general, there will be a work entry in the entry list of the queue object 50 when there is work available to be processed.

If there is not a work entry that can be removed from the queue object 50, then at step 960 the current thread is put in the waiting state 40e. Again, in the preferred embodiment, the current thread that is put in the waiting state 40e is the thread that is executing when the call to remove actually is executed, referred to as the "calling" thread.

On the other hand, if at step 955, there is a entry that can be removed from the queue object 50, then at step 965, the first work entry in the entry list is removed from the entry list of the queue object 50 and its address is returned to the calling thread. The number of work entries in the entry list of the queue object 50, (the "state" of the queue object 50) is then decremented at step 970. At step 975 the number of currently active threads is incremented, which will increase the concurrency level. At step 980 the queue object is associated with the queue object 50, and the routine ends at step 985.

Thus, it will be understood that the operation of the REMOVE object service on the queue object 50 may be used to control the concurrency level of the computer system by controlling the number of active threads when there is sufficient concurrency in the system. On the other hand, the REMOVE object service ensures that the number of active threads is not reduced when there is not enough concurrency in the system by removing a work entry from the queue object 50, if an entry exists in the queue.

As discussed above, the queue objects are created and used only within the executive layer-of operating system and are therefore generally only accessible by components that run in kernel model. User mode subsystems and application programs, however, may also use queue objects provided there is an executive object that exports the capabilities of the queue object to user mode. For example, an executive object may be created to handle multiple simultaneous asynchronous input/output operations in a computer operating system. A full discussion of such a system is provided in commonly owned application Ser. No. 08/428,314, entitled "Method and System for Handling Asynchronous Input/Output Operations" to Lucovsky, et al., which is being filed concurrently herewith and is incorporated herein by reference.

In view of the foregoing, it will be understood that the present invention provides a system and method of controlling the concurrency level of a pool of threads that are active processing incoming requests to an operating system. By keeping track of the current number of active threads, the queue object 50 ensures that the concurrency level remains at or near a predetermined target level of concurrency, thereby minimizing the number of superfluous context switches between threads, improving system throughput and increasing system efficiency.

The present invention has been described in relation to particular embodiments which are intended in all respects to be illustrative rather than restrictive. Alternative embodiments will become apparent to those skilled in the art to which the present invention pertains without departing from its spirit and scope. For example, the present invention has been described in connection with an operating system. However, it will be understood that the invention is also applicable to application programs or other program modules. Accordingly, the scope of the present invention is defined by the appended claims rather than the embodiments of the foregoing discussion.

What is claimed is:

1. A computer system executing an operating system for controlling the execution of a plurality of threads provided by said operating system, each of said plurality of threads in one of a plurality of states when said thread is currently active processing a work entry, said computer comprising:

a microprocessor;

a memory device, coupled to said microprocessor and accessible by said operating system, including a data structure stored in said memory device, said data structure including:

a first section containing an entry list of work entries to be distributed to said plurality of threads; and a second section containing the number of threads that are currently in one of said plurality of states, said microprocessor responsive to said operating system to assign a selected one of said plurality of threads if the number of threads that are currently in one of said plurality of states is less than a predetermined number.

2. The computer system of claim 1, wherein said predetermined number is contained in a third section of said data structure.

3. The computer system of claim 2, wherein said data structure further includes a fourth section containing a wait list of waiting threads.

4. The computer system of claim 3, wherein said data structure further includes:

a fifth section containing the size of said data structure;

a sixth section containing the name of said data structure; and a seventh section including the number of said work entries in said entry list.

5. The computer system of claim 1, wherein said predetermined number defines a target concurrency level; and wherein said number of threads that are currently active processing one of said work entries defines a current concurrency level.

6. The computer system of claim 5, wherein said operating system is operative to reduce the current concurrency level in the event that said current concurrency level is greater than said target concurrency level.

7. The computer system of claim 5, wherein said operating system is operative to increase said current concurrency level in the event said current concurrency level is less than said target concurrency level.

8. In a computer system including a microprocessor, an operating system running on said computer system, a memory device coupled to said microprocessor and accessible by said operating system, said memory device storing a plurality of queue objects, each queue object including an entry list of work entries, a plurality of waiting threads, a current concurrency level and a target concurrency level, a method of controlling the current concurrency level, comprising the steps of:

(a) comparing the current concurrency level with the target concurrency level.

(b) if the current concurrency level is less than the target concurrency level, then:

(i) giving a selected one of said plurality of work entries to a selected one of said plurality of waiting threads;

(ii) executing said selected one of said plurality of waiting threads on said microprocessor;

(iii) incrementing the current concurrency level;

(c) otherwise, inserting said selected one of said plurality of work entries in said entry list.

9. The method of claim 8, further comprising the step of associating said selected waiting thread with a selected one of said plurality of queue objects.

10. In a computer system including a microprocessor, an operating system running on said computer system, a memory device coupled to said microprocessor and accessible by said operating system, said memory device storing a plurality of queue objects, each queue object including an entry list of work entries, a plurality of waiting threads, a current concurrency level and a target concurrency level, a method of controlling the current concurrency level, comprising the steps of:

(a) detecting a calling thread that has completed executing one of said work entries on said microprocessor and is ready to execute another one of said work entries;

(b) if the current concurrency level is less than the target concurrency level, then determining whether any of said plurality of work entries can be removed from said entry list;

(b1) if there is not a work entry in the entry list that can be removed, then instructing said calling thread to enter a waiting state;

(b2) otherwise:

(i) removing a selected one of the plurality of work entries from the entry list;

(ii) decrementing the number of work entries in the entry list;

(iii) incrementing the current concurrency level; and (iv) executing said selected work entry on said microprocessor;

(c) if the current concurrency level is not less than the target concurrency level, then instructing said calling thread to enter a waiting state.

11. The method of claim 10, further comprising the steps of:

determining whether said calling thread is associated with one of said plurality of queue objects;

if the associated queue object is the queue object from which said calling thread is attempting to remove a selected work entry, then decrementing the concurrency level corresponding to that queue object;

if the associated queue object is not the queue object from which said calling thread is attempting to remove a selected work entry, then removing a selected work entry for a different thread.

12. The method of claim 10, wherein said selected one of the plurality of work entries is the first entry in the entry list.

13. A computer system executing a program module for controlling the execution of a plurality of threads provided by said program module, each of said plurality of threads in one of a plurality of states when said thread is currently active processing a work entry, said computer comprising:

a microprocessor;

a memory device, coupled to said microprocessor and accessible by said operating system, including a data structure stored in said memory device, said data structure including:

a first section containing an entry list of work entries to be distributed to said plurality of threads; and a second section containing the number of threads that are currently in one of said plurality of states, said microprocessor responsive to said operating system to assign a selected one of said plurality of threads if the number of threads that are currently in one of said plurality of states is less than a predetermined number.

14. The computer system of claim 13, wherein said predetermined number is contained in a third section of said data structure.

15. The computer system of claim 14, wherein said data structure further includes a fourth section containing a wait list of waiting threads.

16. The computer system of claim 15, wherein said data structure further includes:

a fifth section containing the size of said data structure;

a sixth section containing the name of said data structure; and a seventh section including the number of said work entries in said entry list.

17. The computer system of claim 13, wherein said predetermined number defines a target concurrency level; and wherein said number of threads that are currently active processing one of said work entries defines a current concurrency level.

18. In a computer system including a microprocessor, a program module running on said computer system, a memory device coupled to said microprocessor and accessible by said program module, said memory device storing a plurality of queue objects, each queue object including an entry list of work entries, a plurality of waiting threads, a current concurrency level and a target concurrency level, a method of controlling the current concurrency level, comprising the steps of:

(a) comparing the current concurrency level with the target concurrency level, (b) if the current concurrency level is less than the target concurrency level, then:
(i) giving a selected one of said plurality of work entries to a selected one of said plurality of waiting threads;
(ii) executing said selected one of said plurality of waiting threads on said microprocessor;
(iii) incrementing the current concurrency level;

(c) otherwise, inserting said selected one of said plurality of work entries in said entry list.

19. The method of claim 18, further comprising the step of associating said selected waiting thread with a selected one of said plurality of queue objects.

20. In a computer system including a microprocessor, a program module running on said computer system, a memory device coupled to said microprocessor and accessible by said program module, said memory device storing a plurality of queue objects, each queue object including an entry list of work entries, a plurality of waiting threads, a current concurrency level and a target concurrency level, a method of controlling the current concurrency level, comprising the steps of:

(a) detecting a calling thread that has completed executing one of said work entries on said microprocessor and is ready to execute another one of said work entries;

(b) if the current concurrency level is less than the target concurrency level, then determining whether any of said plurality of work entries can be removed from said entry list;

(b1) if there is not a work entry in the entry list that can be removed, then instructing said calling thread to enter a waiting state;

(b2) otherwise:
(i) removing a selected one of the plurality of work entries from the entry list;
(ii) decrementing the number of work entries in the entry list;
(iii) incrementing the current concurrency level; and
(iv) executing said selected work entry on said microprocessor;

(c) if the current concurrency level is not less than the target concurrency level, then instructing said calling thread to enter a waiting state.

21. The method of claim 20, further comprising the steps of:

determining whether said calling thread is associated with one of said plurality of queue objects;

if the associated queue object is the queue object from which said calling thread is attempting to remove a selected work entry, then decrementing the concurrency level corresponding to that queue object;

if the associated queue object is not the queue object from which said calling thread is attempting to remove a selected work entry, then removing a selected work entry for a different thread.

22. The method of claim 21, wherein said selected one of the plurality of work entries is the first entry in the entry list.

23. A computer readable medium having stored therein instructions for causing a computer system to execute the method of claim 8.

24. A computer readable medium having stored therein instructions for causing a computer system to execute the method of claim 10.

25. A computer readable medium having stored therein instructions for causing a computer system to execute the method of claim 18.

26. A computer readable medium having stored therein instructions for causing a computer system to execute the method of claim 20.

* * * * *